H. VÖGELE & K. KLENSCH.
TURN TABLE.
APPLICATION FILED APR. 25, 1914.
1,220,031.  Patented Mar. 20, 1917.
5 SHEETS—SHEET 4.
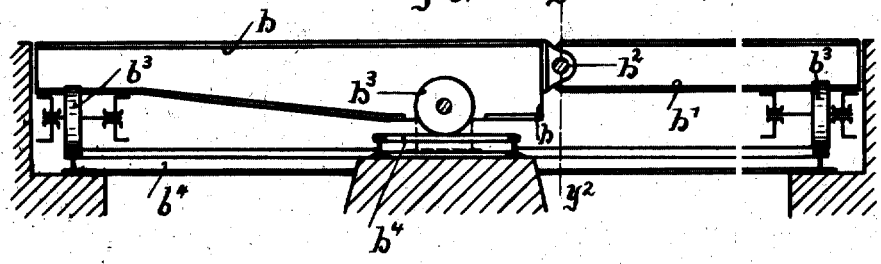
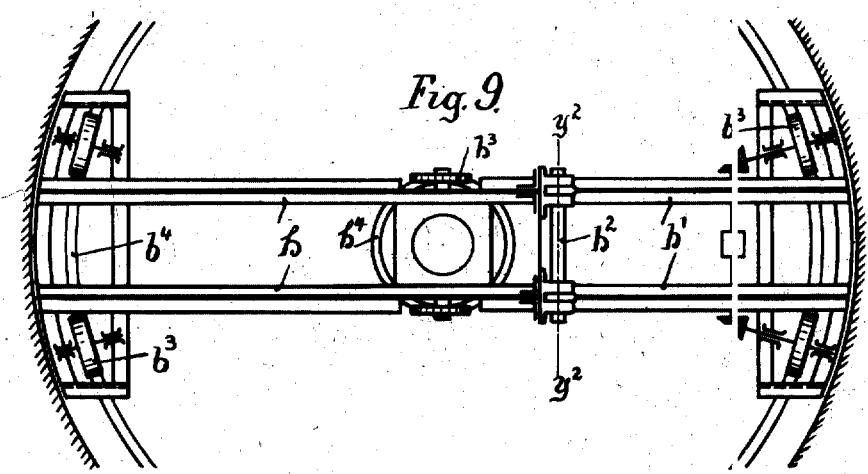
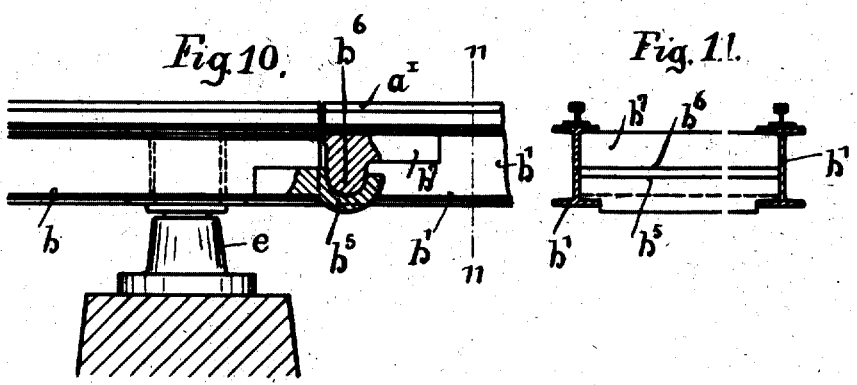
Witnesses:
Inventors:
Heinrich Vögele
Carl Klensch

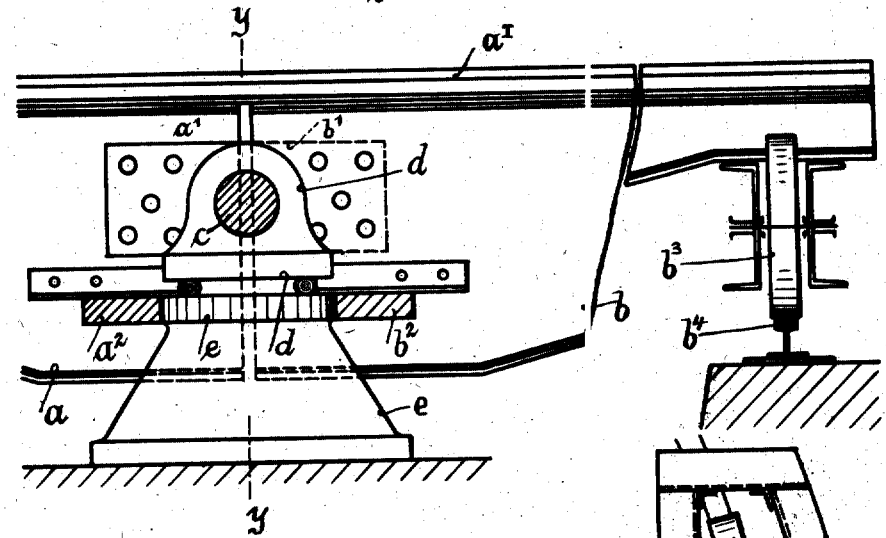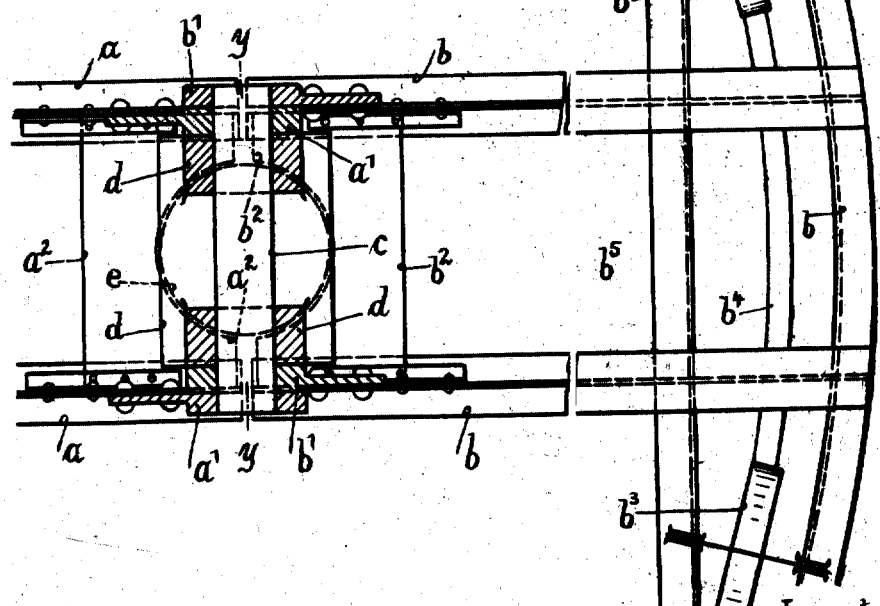

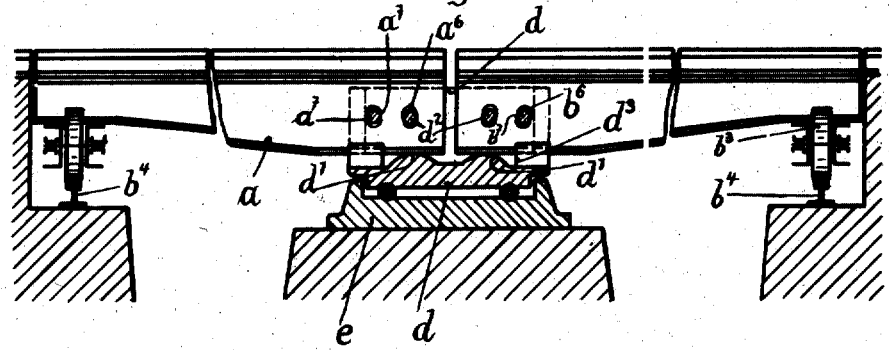
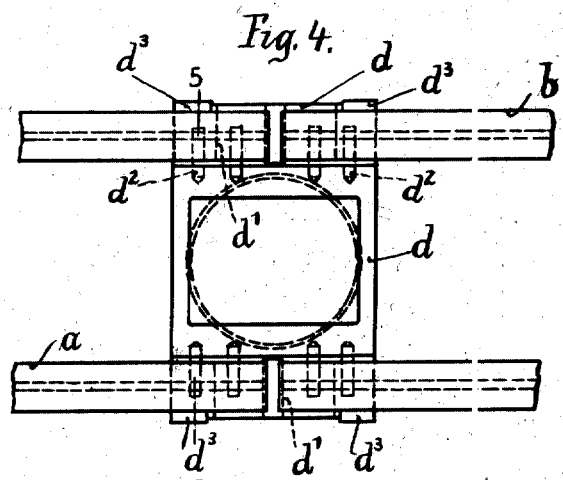
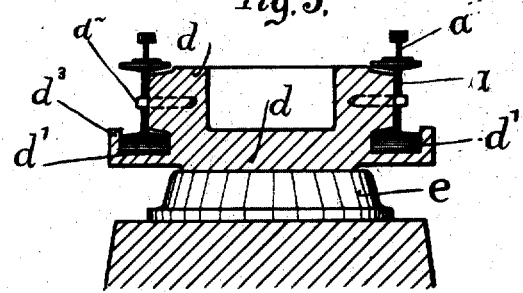

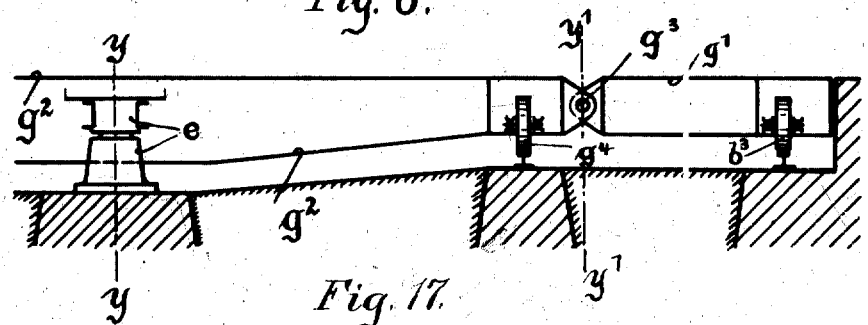
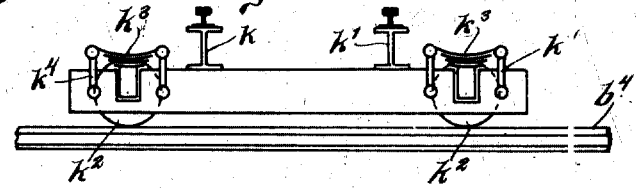
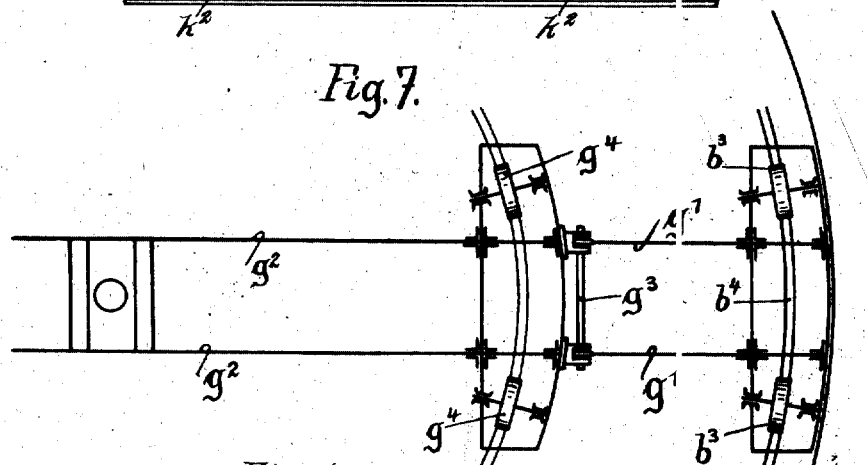
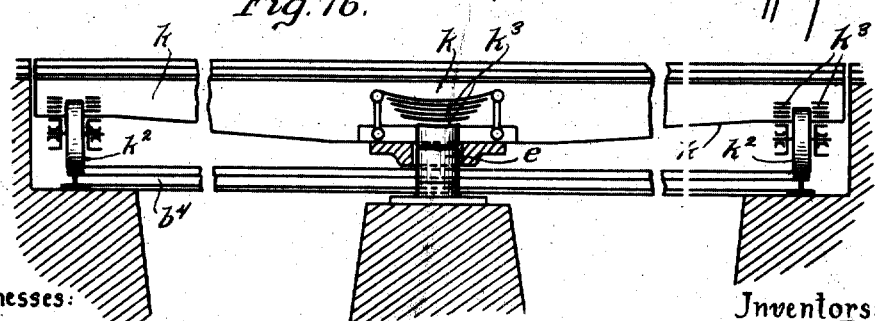

UNITED STATES PATENT OFFICE.

HEINRICH VÖGELE, OF MANNHEIM, AND KARL KLENSCH, OF LUDWIGSHAFEN-ON-THE-RHINE, GERMANY.

TURN-TABLE.

1,220,031.　　　　　Specification of Letters Patent.　　Patented Mar. 20, 1917.

Application filed April 25, 1914. Serial No. 834,418.

*To all whom it may concern:*

Be it known that we, HEINRICH VÖGELE, kgl. kommerzienrat, a resident of Mannheim, and KARL KLENSCH, kgl. eisenbahnheim, assessor, of Ludwigshafen-on-the-Rhine, Germany, have invented certain new and useful Improvements in Turn-Tables, of which the following is a specification.

This invention relates to turntables for use on railways for turning locomotives and other rolling stock. As hitherto generally constructed the turntable, carried by a pair of main girders, is pivoted on a strong central pivot about which it can rotate, the outer ends of the girders being fitted with supporting rollers which only bear on a circular rail track when the table is under load, that is to say, when a locomotive or other rolling stock is run on to the table.

The main girders, therefore, are not statically suported in a definite manner.

The disadvantages of such a construction are:—

An unloading device is required at the ends of the main girders in order that the rails on the turntable may remain at the same level with those of the permanent way when a locomotive or the like is being run on to the table; the main girders must be very high and therefore the turntable pit must be correspondingly deep; the level of the turntable must be accurately adjusted and continuously controlled, and variations in the sinking of the foundation of the turntable cause considerable resistance to turning and even interfere with the operation of the table.

The present invention obviates these difficulties. It improves and simplifies the construction of turntables of large diameter as at present required, and facilitates the reconstruction or the extension of existing smaller turntables.

Our invention broadly stated consists in a turntable which comprises main girders statically supported in a definite manner, the main girders being constructed to form if considered as a whole a rigid beam in their longitudinal direction and as regards the horizontal lateral forces and which are supported by a center bearing and trucks at suitable places of the turntable for supporting it.

There are a large number of constructional forms all made according to and showing this general feature of our invention. Two remarkable and peculiar main plans of carrying out the invention are:

I. The main girders of the turntable may be divided into one or more sections, the adjacent ends of the sections being connected by hinge joints having horizontal turning axis.

II. A resilient deformation may be permitted to occur, (a) in the main girders of the turntable in at least one section in a vertical plane by reducing the rigidity of the main girders at that section, or (b) in those members on which the turntable rests at its points of support.

The different arrangements and particular constructions of these various forms of turntables are clearly described hereinafter and fully represented in the accompanying drawings:

Figures 1, and 2 are respectively a side elevation and a plan partly in section illustrating one form of turntable according to the invention (plan I).

Figs. 3, 4 and 5 are respectively a side elevation, partly in section, a plan and a cross-section, illustrating a second form, the cross-section, Fig. 5, being taken on the line 5—5 Fig. 4 (plan I).

Figs. 6 and 7 illustrate diagrammatically in side elevation and plan, the right hand half of a third form of table (plan I).

Figs. 8 and 9 illustrate somewhat diagrammatically, in sectional elevation and plan, a fourth form of table (plan I).

Fig. 10 is a side elevation, partly in section, of a fifth constructional example (plan I).

Fig. 11 being a cross-section on the line 11—11 of Fig. 10.

Figure 12:
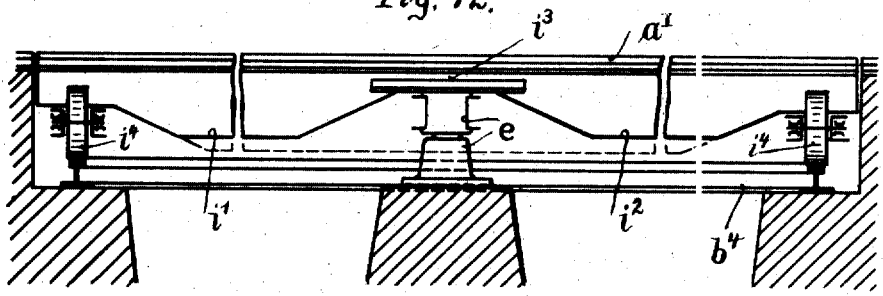
Figure 13:
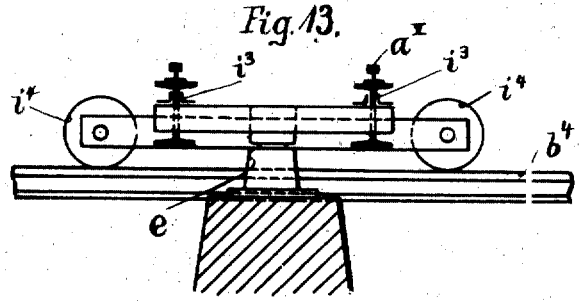

Figs. 12 and 13 are respectively a side sectional elevation and cross-section, illustrating a form of construction in which the main girders are constructed of reduced rigidity in the position where they are intended to flex (plan II*a*).

Figure 14:
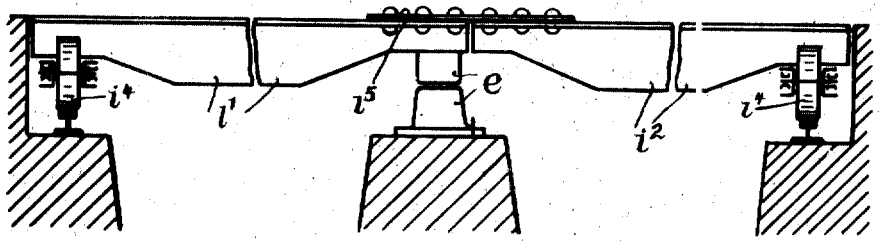
Figure 15:
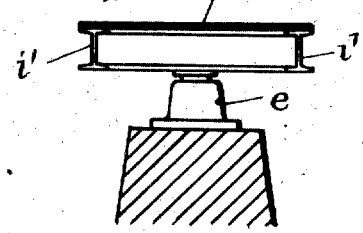

Figs. 14 and 15 being similar views illustrating another example of this type of construction (plan II*b*).

Figs. 16 and 17 are respectively a side sectional elevation and end view, illustrating a turntable in the plan II$^b$ according to which the yielding occurs at the points of support.

In carrying out the invention according to the first plan and as illustrated by Figs. 1 and 2, the main girders are divided at the center on a central plane $y\ y$, the adjacent ends $a\ a$ and $b\ b$ being connected by a hinge joint comprising eyes $a'\ b'$ and a bolt $c$ which passes through said eyes and an intermediate member $d$. The fulcrum of the hinge is horizontal. The intermediate member $d$ is supported by the central bolt $e$ and it can turn on this together with the main girders. Two semicircular plates $a^2\ b^2$, which are rigidly secured to the corresponding ends of the girders guide the turntable on the bolt $e$. The outer ends of the girders have rollers $b^3$ which bear on a rail track $b^4$. $b^5$ is the right hand transverse support of the turntable.

By means of the hinged connection above described the main girders are firmly connected together longitudinally; considered as an entirety they are also rigid as regards the horizontal lateral forces and they are statically securely mounted.

In the turntable as illustrated by Figs. 3 to 5, the intermediate member $d$ is provided with cylindrical bearings or fulcra $d'$ on which the inner ends of the main girders are freely supported. Pins $d^2$ screwed into or otherwise secured in the intermediate member pass through slots $a^6\ b^6$ in the girders. The slots have curved guiding surfaces $a^7\ b^7$ which conform to arcs of circles struck from centers on the rail track $b^4$. Guards $d^3$ are provided at the sides of the intermediate member $d$ for the lower flanges of the girders.

By the arrangement above described it is possible for the ends of the girders to move on the curved bearings while adequate longitudinal and horizontal rigidity of the girders is insured.

The turntable illustrated by Figs. 6 and 7 shows the main girders symmetrically divided on both sides of the center plane $y\ y$ in planes $y'\ y'$. One of the outer sections of the turntable is indicated by $g'$. These sections form extensions or additions to the inner sections $g^2$. The sections $g^2$ are connected to the extension sections by hinge bolts $g^3$. Suitable supporting rollers $g^4$ are provided near the hinged joints. The outer ends of the turntable are provided with supporting rollers $b^3$ adapted to bear on the track $b^4$. One of the sections $g'$ may carry the driving mechanism for the turntable, the section in question thereby acting also as a so-called operating truck.

Instead of the main girders being divided symmetrically in relation to the center they may be divided at a position intermediate of the center and one of the outer ends, for instance, as indicated in Figs. 8 to 11. In the figures the line $y^2\ y^2$ indicates the plane of division and the larger section $h$ of the main girders is connected to the shorter section $h'$ by a hinge bolt $h^2$. Rollers $h^3$ and a rail track $h^4$ support the turntable near its axis of rotation. Any other suitable form of central support $e$ can be used for this purpose. In the form indicated in Figs. 10 and 11 an open hinge joint is used comprising a semi-circular or recessed supporting member $h^5$ rigidly secured to the section $h$ and a corresponding semicylindrical pivot $h^6\ h^7$ rigidly secured to the section $h'$.

In carrying out the invention according to the plan II$^a$ illustrated by Figs. 12 to 15 the same object is obtained as by the hinge joint hereinbefore described with reference to the other examples, by permitting a resilient deformation of the main girders. With this object in view the sections $i'$ and $i^2$ of the main girders are made of reduced sections at the point $i^3$ (Figs. 12 and 13), where they are supported by the central pivot $e$. The outer ends of the girders are supported on rollers $i^4$. In the example illustrated in Figs. 14 and 15 the sections $i'$ and $i^2$ of the girders are constructed as separate parts which are riveted or otherwise suitably connected together by a strong horizontal plate $i^5$. At the weakened section of the main girders the two portions of the turntable can yield relatively to one another to a sufficient degree as required by unequal loading or variations in level of the points of support $e$ and $i^4$.

The further plan II$^b$ of carrying out the invention as illustrated by Figs 16 and 17, the necessary yielding of the main girders is obtained by providing resilient means in the members on which the turntable bears at its points of support. For example, the main girders $k\ k'$ may be of the usual construction at present in use. Between the main girders and the central pivot $e$ and the rollers $k^2$ plate springs $k^3$ are provided. The turntable is suspended from the springs by tie rods $k^4$. By these means the level adjustment of the supporting points of the turntable or of the main girders may be independent of one another and according to the magnitude of the load.

Having now particularly described and ascertained the nature of our said invention and in what manner the same is to be made, we declare that what we claim is:—

1. A turntable comprising main girders, each girder consisting of a plurality of girder sections, being united to permit vertical movement, and rigidly connected with each other in their longitudinal direction as regards horizontal movement, a center bearing and supporting rollers at suitable places under the girder sections.

2. A turntable comprising main girders, each girder consisting of a plurality of girder sections, being united to permit vertical movement, and rigidly connected with each other in their longitudinal direction as regards horizontal movement and means for guiding and supporting the turntable.

3. A turntable comprising main girders, each girder consisting of a plurality of girder sections, being united to permit vertical movement, and rigidly connected with each other in their longitudinal direction as regards horizontal movement, a center ball bearing and supporting rollers at suitable places of the girder sections for guiding and supporting the turntable respectively.

4. A turntable comprising main girders divided in a central plane of the turntable into two sections, hinge joints having horizontal pivotal axes and connecting the adjacent ends of the said sections of the main girders, rails rigidly fastened to those girder sections, which carry the said rails, a center bearing carrying the said hinge joints and trucks at the outer ends of the said sections.

5. A turntable comprising main girders divided in a central plane of the turntable into two sections, bearing eyes having horizontal axes and provided at the adjacent ends of the said sections, an intermediate member also provided with eyes, a hinge bolt freely mounted in the said eyes of the sections and the intermediate member, a central pivot supporting the latter and trucks at the outer ends of the main girders.

6. A turntable comprising main girders divided in a central plane of the turntable into two sections bearing eyes having horizontal axes and provided at the adjacent ends of the said sections, an intermediate member also provided with eyes, a hinge bolt freely mounted in the said eyes of the sections and the intermediate member, a central pivot supporting the latter, trucks at the outer ends of the main girders, and a mechanism to be operated by manual or other power having connection with one or more wheels of the trucks, propelling same and actuating the table.

7. A turntable comprising main girders divided in a central plane of the turntable into two sections, an intermediate member having curved bearings supporting the adjacent ends of the main girder sections, pins firmly secured to the said intermediate member and passing through curved slots in the web of adjacent ends of the main girders, a center bearing carrying the said member and trucks at the outer ends of the said girder sections substantially as hereinbefore described.

8. A turntable comprising in combination main girders divided on each side of the center, hinge joints having horizontal axes and connecting the adjacent ends of the main girder sections at the sectional planes, a center bearing, and supporting rollers at the outer ends of the turntable and at the hinge joints.

9. A turntable comprising in combination main girders divided once on each side of the center and symmetrically in relation thereto, hinge joints having horizontal axes and connecting the outer girder sections to the inner sections, a center bearing and supporting rollers supporting the outer ends of the inner section and the outer ends of the outer sections and rail tracks carrying the supporting rollers.

10. A turntable comprising in combination main girders divided once on each side of the center and symmetrically in relation thereto, hinge joints having horizontal axes and connecting the outer girder sections to the inner sections, a center bearing, supporting rollers supporting the outer ends of the inner section and the outer ends of the outer sections, rail tracks carrying the supporting rollers and a power operated mechanism arranged on one of the outer sections of the turntable and having connection with the supporting rollers of the said outer turntable-section, for propelling the rollers and actuating the table.

11. A turntable comprising in combination main girders divided by a plane intermediate of the center and one of the outer ends, a hinge joint connecting the adjacent ends of the girder sections and having a horizontal axis, means for supporting and guiding the turntable at the outer ends of the sections, at the hinge joint and at the center.

12. A turntable comprising in combination main girders divided by one perpendicular transverse plane in the neighborhood of the center of the table, a closed hinge joint connecting the adjacent ends of the girder sections, a center bearing and trucks at the outer ends of the sections substantially as described.

13. A turntable comprising in combination main girders divided by one perpendicular transverse plane in the neighborhood of the center of the table, a hinge joint connecting the adjacent ends of the girder sections, a center bearing and trucks at the outer ends of the table substantially as described.

14. A turntable comprising in combination main girders divided by a transverse plane in the neighborhood of the center of the table, a closed hinge joint connecting the adjacent ends of the girder sections, a center bearing, trucks at the outer ends of the sections, a power operated mechanism arranged on one of the table sections and actuating one or more supporting rollers.

15. A turntable comprising main girders having at least one section the moment of inertia of which is reduced for enabling the girders to flex in a vertical plane, rails so rigidly fastened to the girders that the girders are allowed of flexing in the vertical plane, a center bearing and supporting rollers at the outer ends of the girders and at the said section for carrying the table.

In witness whereof we have hereunto set our hands in the presence of two witnesses.

HEINRICH VÖGELE.
KARL KLENSCH.

Witnesses:
D. Geo. Fritz Berg,
S. S. Berger.